United States Patent [19]
Kieronski et al.

[11] 3,916,610
[45] Nov. 4, 1975

[54] ROVING FRAME BOLSTER

[75] Inventors: John P. Kieronski, Charlotte, N.C.;
Charles W. Long, Rock Hill, S.C.

[73] Assignee: Whitin Machine Works, Inc.,
Charlotte, N.C.

[22] Filed: June 26, 1974

[21] Appl. No.: 483,400

[52] U.S. Cl. .................. 57/71; 57/102; 57/135;
308/26; 308/149
[51] Int. Cl.² ...................... D01H 7/12; D01H 7/24
[58] Field of Search ......... 57/67, 71, 102, 129, 130,
57/135; 308/155, 156, 157, 26, 141, 143, 149

[56] References Cited
UNITED STATES PATENTS

| | | | |
|---|---|---|---|
| 2,586,293 | 2/1952 | Birkigt | 57/102 |
| 2,788,633 | 4/1957 | Birkigt | 57/102 |
| 3,421,306 | 1/1969 | Herubel | 57/71 |
| 3,641,759 | 2/1972 | Kohler | 57/129 |
| 3,789,598 | 2/1974 | Kieronski | 57/71 |

*Primary Examiner*—John Petrakes
*Attorney, Agent, or Firm*—McNenny, Farrington, Pearne & Gordon

[57] ABSTRACT

A mounting arrangement for a bolster tube in a roving frame spindle assembly providing a low resonant frequency in the assembly structure to permit high speed operation. The bolster tube is resiliently biased to a centered position by an axially oriented compression spring which determines the lateral deflection rate of the bolster tube and which develops a damping force on a friction washer embracing the exterior of the bolster tube to reduce extraneous movement of the assembly.

12 Claims, 3 Drawing Figures

ROVING FRAME BOLSTER

BACKGROUND OF THE INVENTION

The invention relates to improvements in roving frames and, specifically, to a nonrigid spindle mounting assembly in a roving frame.

PRIOR ART

Typically, previous roving frames have employed rigid structures for supporting individual spindle shaft and flyer assemblies at individual stations. Vibration, induced by forces developed in the drive train of the spindle, or from other sources, has often limited practical operating speeds. Attempts at balancing the rotating spindle parts have been of limited success.

One approach to solving the problem of spindle vibration is disclosed in U.S. Pat. No. 3,789,589 to Kieronski, wherein it is taught to resiliently mount the bolster tube of a spindle station so that the resonant frequency of the spindle structure is substantially less than the rotational frequency of a desired operating speed of the spindle shaft. As disclosed therein, resilient mounting of the bolster tube is achieved by supporting the bolster tube in an elastic bushing adapted to deflect in response to vibrational forces on the bolster tube. Also disclosed in this patent is a motion damping subassembly for controlling precession-like oscillation of the spindle assembly. The damping subassembly operates directly on the spindle shaft and is therefore subject to wear through relative rotation between the shaft and the friction element.

SUMMARY OF THE INVENTION

The invention provides a resiliently mounted roving frame spindle assembly in which a bolster tube is nonrigidly centered along the spindle axis by an axial spring force maintaining a surface of the tube in engagement with a supporting surface on the machine frame. The spring force is also employed to produce a frictional damping force to control precession-like oscillation of the spindle assembly. The arrangement thereby provides both resilient mounting for a low resonant frequency structure and damping for reducing extraneous motion from the same structural members. In comparison to the resilient bolster mounting of the prior art discussed above, the invention requires a reduced number of parts in its embodiment. In affording this reduction of parts, the invention provides lower manufacturing, assembly, and inventory costs. Further, the damping means provided by the invention is arranged to cooperate with nonrotating elements and is therefore not subject to wear through relative rotation of mating parts.

In the preferred embodiments disclosed below, a compression spring is confined in a bore of a bolster tube supporting bracket concentrically around a lower end of the tube. One end of the spring biases the tube against a fixed surface in the bore to a seating position in which the tube is aligned along the ideal spindle axis. The opposite end of the spring abuts a friction washer and maintains the washer in engagement with an opposed radial surface on the bracket. The washer is dimensioned to closely embrace the exterior of the bolster tube so that lateral movement of the tube is imparted to the washer. The combined movement of the tube and washer is resisted by sliding frictional engagement between the washer and the opposed radial surface. The spindle shaft and flyer are thereby restrained from extraneous lateral deflection indirectly through the bolster tube in an efficient manner where the friction damping elements are isolated from the rotational movement of the spindle shaft.

DESCRIPTION OF THE PREFERRED EMBODIMENT

Figure 1:
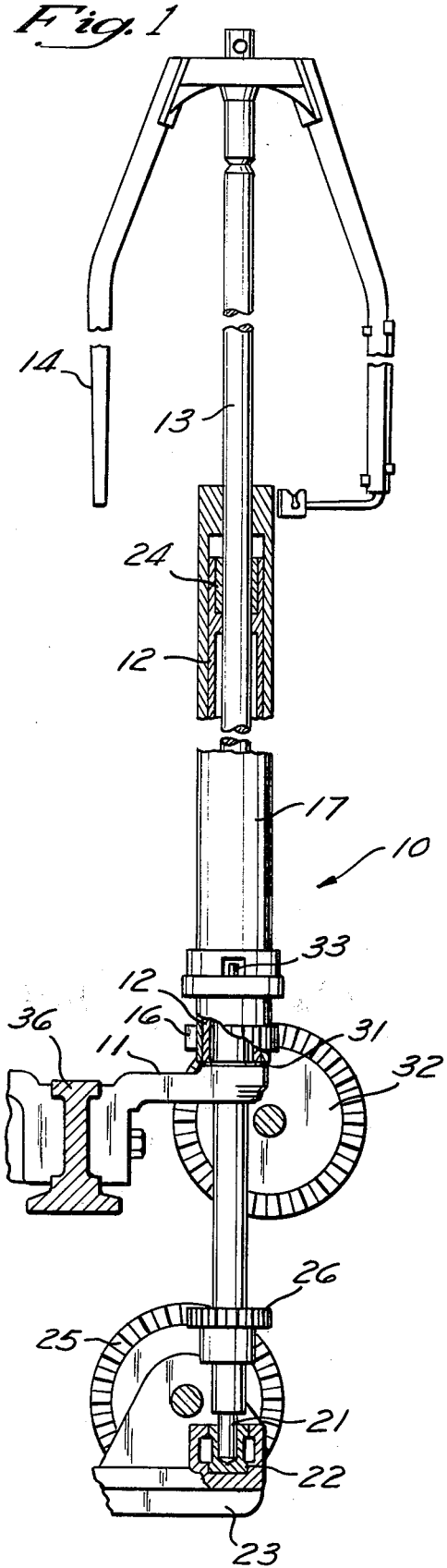
FIG. 1 is an elevational view, partially in section, of a typical spindle station.

Referring to FIG. 1, there is shown a spindle station 10 in a roving frame which includes a bolster bracket 11 and a bolster tube 12, a spindle shaft 13 and flyer 14, and a bobbin gear 16 and bobbin 17. With the exception of the arrangement of the bolster tube 12 on the bracket 11, the remaining elements of the spindle station are of conventional construction, and it will be understood that a typical roving frame will employ a plurality of spindle stations along its length.

The spindle shaft 13, at a lower end 21, is rotatably supported axially and radially in a bearing unit 22. The bearing unit 22 is mounted in a step bracket 23 on the frame of the machine. The upper portion of the spindle shaft 13 is radially supported by a sleeve bearing 24 in an upper end of the bolster tube 12. The spindle shaft 13 is rotated by a drive gear 25 through a pinion 26 fixed to the shaft. As is customary, the flyer 14 is removably keyed to the shaft 13 and rotates with it to twist a strand of fibers and simultaneously wind the strand on the bobbin 17.

The bobbin gear 16 is axially rotatably supported on the bolster bracket 11 by a bearing thrust washer 31 and on the exterior of the bolster tube 12. The bobbin gear 16 is rotated by an associated drive gear 32. The bobbin 17 rests vertically on the gear 16 and is driven thereby through a pin 33 pressed into the gear and received in a slot formed in a lower face of the bobbin.

The bolster bracket or body 11 is bolted to a frame rail 36 common to the bolster brackets of a plurality of other spindle stations on the machine. The rail 36 reciprocates vertically to move bobbin 17 vertically along the shaft 13 to allow the flyer to distribute a fiber strand along the full length of the bobbin.

Figure 2:
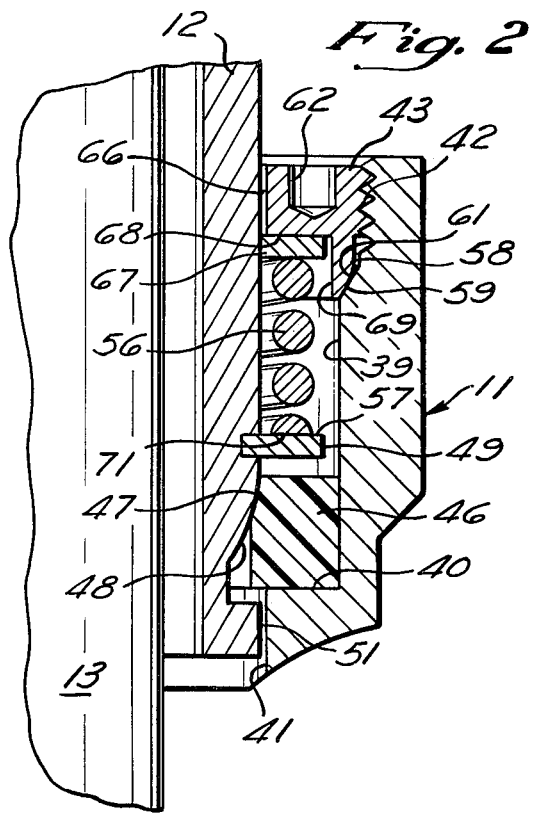
FIG. 2 is an enlarged, fragmentary sectional view of a bolster tube mounting area of the spindle station illustrating details of a first embodiment of the invention.

Referring to FIG. 2, there is illlustrated a first embodiment of the invention, wherein the bolster bracket 11 includes a vertical circular bore 39 having at a lower portion thereof an annular radial surface or shoulder 40, and a reduced diameter cylindrical portion 41. An upper end of the bore 39 is provided with internal threads 42 for reception of an externally threaded retaining nut 43. A ball seat 46 for supporting the bolster tube 12 is positioned against the radial shoulder 40 in the bracket bore 39. The seat 46, ideally, is made of nylon or other rigid wear-resistant material, and is formed with an annular segment 47 of a spherical surface. The ball seat 46 is in the form of a circular bushing, and is slotted radially at one point (not shown) to permit it to radially expand into tight engagement with the bore 39 when the bolster tube is firmly seated in the spherical surface 47.

The bolster tube of steel or other rigid material 12 is machined or otherwise formed with a peripheral spherical surface 48 complementary to the ball seat surface 47. Immediately above the spherical or ball surface 48 there is provided a steel snap ring or split washer 49 on the exterior of the bolster tube. In the illustrated embodiment, the center of the ball surface 48 is arranged at the intersection of the bolster tube axis and the plane of the washer 49. Below the ball surface 48 a lower cylindrical end 51 of the tube 12 cooperates with the cylindrical bore portion 41 to limit pivotal movement of the tube 12 in the bracket 11. In one example, where the bolster tube surface 51 is 1.5 inches in diameter, a radial clearance of between 0.002 and 0.005 inch is provided.

A resilient element 56 in the form of a helical steel compression spring is concentrically arranged over the exterior of the bolster tube 12 in the bracket bore 39. The spring 56 is compressed between an upper surface 57 of the snap ring 49 and the retaining nut 43. The nut 43 includes a tubular lead portion 58 having a relatively thin wall section. A conical surface 59 on the tubular portion 58, decreasing in diameter toward its forwardmost end, seats against a conical surface 61 of similar taper in the bore 39. During assembly, the nut 43, driven by a spanner wrench or similar tool engaging one or more axially aligned holes 62, is turned into the threads 42. Radial compression on the tubular portion 58 by the conical or camming surface 61 develops elastic compression in the tubular portion to produce an adequate frictional force to maintain the nut 43 in the bracket 11. An aperture 66 in the nut 43 is dimensioned, like the bracket bore portion 41, with between 0.002 and 0.005 inch of radial clearance with an adjacent portion of the bolster tube 12 having a nominal diameter of 1.5 inches, for example.

A friction washer 67 is interposed between the spring 56 and a radial face 68 of the nut 43. The washer 67 is formed with an inside diameter substantially equal to the outside diameter of the bolster tube 12 to provide a close sliding fit on the tube, while the outside diameter of the washer is somewhat less than the diameter of a cylindrical bore 69 of the tubular nut portion 58. Ideally, the clearance between the washer 67 and bore 69 is at least as great as the clearance between the bolster tube 12 and nut aperture 66.

The bolster tube 12 is pivotal laterally on the ball seat 47 from an ideal spindle axis which, in the illustrated case, is along a vertical central line. The spring 56 is dimensioned, preferably to provide in its compressed assembled state between the washers 49 and 67 a force of approximately 40 pounds. The ends of the spring 56 are squared and ground so that they present flat surfaces 71 to the washers 49,67 in planes transverse to the axis of the spring and bolster tube in a normal state. This spring configuration tends to center the bolster tube 12 to its illustrated vertical position by biasing the split washer 49 to a plane transverse to the spindle axis.

Unbalanced forces developed during rotation of the flyer 14 and/or bobbin 17 induce vibration into the spindle assembly 10. These unbalanced loads result in lateral displacement of the spindle shaft 13 and bolster tube 12 as the tube pivots or rocks in the ball seat 46. This rocking movement of the bolster tube causes the washer 49 to deflect out of a horizontal plane, i.e., a plane transverse to the ideal spindle axis, and causes at least a portion of the spring 56 to be compressed beyond its normal compression state. Resistance to this movement by the spring 56 tends to return the bolster tube 12 to its vertical position. Proper selection of the spring stiffness produces a deflection rate sufficiently low to result in a resonant frequency in the spindle assembly substantially less than a desired operating speed, for example 1200 r.p.m. In the resultant structure, vibrational displacement is therefore not amplified at the operating speed.

Due to the relatively soft suspension provided by the spring 56, the spindle assembly exhibits a tendency during operation at full speed to slowly oscillate in a movement analogous to the precessional movement of a top. The friction washer 67, with movement imparted by the bolster tube, slides across the radial surface 68 of the nut 43 with the normal force developed by the spring 56 and substantially damps or eliminates this extraneous motion. The damping action of the washer 67 is assisted by similar friction damping action produced by relative sliding surfaces 47 and 48 in the ball seat 46.

Figure 3:
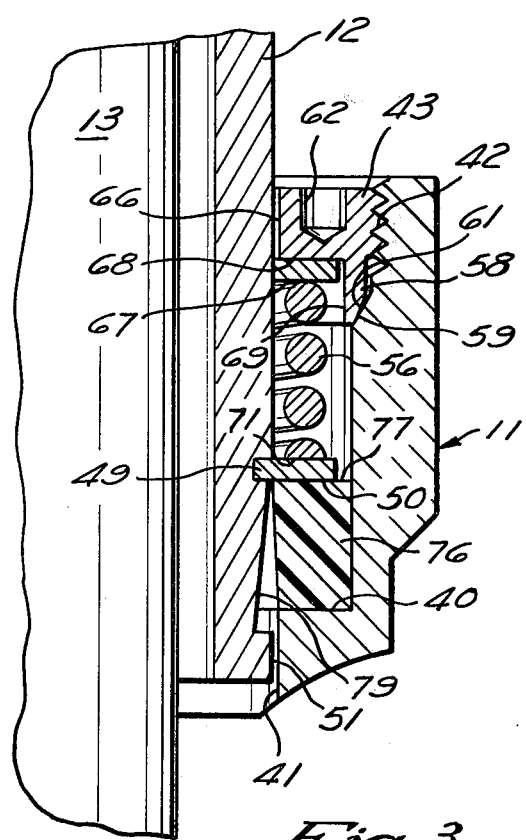
FIG. 3 is an enlarged view, similar to FIG. 2, illustrating details of a second embodiment of the invention.

FIG. 3 illustrates a second embodiment of the invention in which like parts are designated with the same numerals used in the embodiment of FIG. 2. A bushing 76 of nylon or other wear-resistant material is seated against the annular radial surface 40 of the bracket bore 39. An annular radial face 77 of the bushing 76 axially supports the bolster tube 12 through a lower face 50 of the split washer 49 peripherally engaging the tube. The spring 56 yieldingly maintains the washer surface 50 in contact with the bushing surface or seat 77 such that the bolster tube 12 is biased to a vertical orientation parallel with the ideal spindle axis. Pivotal movement of the bolster tube 12 causes the washer 49 to be lifted at a side opposite that to which the upper end of the bolster tube is deflected. The resistance of the spring 56 to such movement, by proper dimensioning of the elements, results in a resonant frequency of the spindle structure which is substantially below a desired operating speed.

As in the embodiment of FIG. 2, the apertures or bores 41 and 66 of the bracket 11 and nut 43 are dimensioned with respect to the adjacent surfaces of the bolster tube to restrain the maximum lateral deflection of the bolster tube to an appropriate limit. An undercut or conical surface 79 on the tube 12 in the area of bushing 76 eliminates interference between the tube and bushing during pivotal movement on the washer 49. As in the embodiment of FIG. 2, the washer 67 damps precession-like movement of the spindle assembly. Similarly, movement of the lower washer 49 on the surface 77 provides additional damping action, although somewhat less than that provided by the ball seat 46 of the embodiment of FIG. 2.

It is seen from the disclosed embodiments that a relatively simple structure is provided to resiliently support the bolster tube, and, hence, the spindle shaft 13 and flyer 14. Moreover, both direct vibrational motion and extraneous precession-like movement of parts of the spindle assembly are damped by means which is not subject to wear through relative rotation between the spindle shaft 13 and the damping means.

While specific embodiments of the invention are shown, it is understood that various modifications and rearrangements of parts may be resorted to without departing from the scope of the invention defined in the following claims.

What is claimed is:
1. In a roving frame, a spindle assembly for twisting a strand of fibers and winding the strand on a bobbin, said spindle assembly including a rotatable spindle shaft and a flyer affixed to the shaft, a bolster tube, a bobbin rotatably supported on the exterior of the bolster tube, drive means including means for driving the spindle at a desired speed and means for rotating the bobbin, said spindle shaft being rotatably supported in the interior of the bolster tube, means resiliently supporting the bolster tube on an element of the roving frame for lateral pivotal movement relative to the frame element, said resilient supporting means including a rigid annular surface fixed relative to the frame element, a rigid peripheral surface on the bolster tube adjacent a lower end thereof, said peripheral surface being in abutting contact with said annular surface and being axially supported thereby, and spring means to axially resiliently bias said peripheral surface into engagement with said annular surface whereby lateral pivotal movement of said bolster tube resulting in relative movement between said peripheral surface and said annular surface is resisted by said spring means.

2. A roving frame as set forth in claim 1, wherein said spring means comprises a compression spring, and including means to maintain said compression spring in a compressed state.

3. A roving frame as set forth in claim 2, wherein said compression spring is concentrically arranged over the bolster tube adjacent its lower end.

4. A roving frame as set forth in claim 3, wherein a body on said frame element includes a bore, and said lower bolster tube end and said compression spring are received in said bore.

5. A roving frame set forth in claim 4, wherein apertures at each end of said bore are provided, portions of said bolster tube extending into each of said apertures, the dimensions of said apertures being selected with a predetermined clearance with said bolster tube portions to limit pivotal movement of said tube therein.

6. A roving frame as set forth in claim 5, including a radial surface fixed to said body adjacent one end of said bore, and a friction washer having an internal diameter substantially equal to the outside diameter of the bolster tube adjacent said radial surface, said washer being positioned over said bolster tube and being held against said radial surface by said spring whereby pivotal movement of said tube is resisted by sliding frictional engagement between said washer and said radial surface.

7. A roving frame as set forth in claim 6, wherein one of said apertures is provided by a retaining nut threaded into an end of said body bore, said nut providing said radial surface.

8. A roving frame as set forth in claim 7, wherein said nut includes self-retaining means engageable with a cooperating portion of said bore to maintain said nut in said bore.

9. A roving frame as set forth in claim 8, wherein said self-retaining means includes a tubular extension having a conical exterior surface, and said cooperating bore portion having a conical surface substantially complementary to said conical exterior surface.

10. A roving frame as set forth in claim 9, wherein said annular surface is a segment of a spherical surface forming a socket and said peripheral surface is a segment of a spherical surface forming a ball portion in said socket.

11. A roving frame spindle assembly comprising a body secured to a roving frame, a bolster tube resiliently mounted on the body, a spindle shaft rotatably journaled in the bolster tube, a bobbin rotatably supported on the exterior of the bolster tube, a flyer on the spindle shaft for winding a strand of fibers on the bobbin, said body including a bore aligned with the axis of the spindle shaft, a lower end of said bolster tube being supported in said bore, a helical compression spring in the body bore concentrically arranged about the exterior of the lower bolster tube end, an annular seating surface in the body bore, a peripheral surface on the exterior of the tube in abutting engagement with said annular seating surface, said annular surface axially supporting said tube through said peripheral surface for pivotal movement thereon, one end of said spring having means to bias said tube to an aligned position relative to the spindle axis, a washer in said bore embracing the exterior of said tube with a sliding fit, a radial surface on said body in abutting engagement with said washer, the other end of said spring biasing said washer into frictional engagement with said radial surface whereby pivotal movement of said tube on said annular surface produces sliding frictional engagement between said washer and radial surface, and means on said body limiting the maximum lateral displacement of said tube on said body.

12. A roving frame spindle assembly as set forth in claim 11, wherein said annular surface provides a spherical socket surface and said annular surface provides a spherical ball surface.

* * * * *